United States Patent [19]

Akamatsu

[11] 4,319,176
[45] Mar. 9, 1982

[54] SYNCHRONOUS MACHINE DRIVE APPARATUS

[75] Inventor: Masahiko Akamatsu, Amagasaki, Japan

[73] Assignee: Mitsubishi Denki Kabushiki Kaisha, Tokyo, Japan

[21] Appl. No.: 954,472

[22] Filed: Oct. 25, 1978

Related U.S. Application Data

[63] Continuation-in-part of Ser. No. 863,907, Dec. 23, 1977.

[30] Foreign Application Priority Data

Dec. 23, 1976 [JP] Japan ................ 51-155914

[51] Int. Cl.³ .............................. H02P 7/06
[52] U.S. Cl. .................................... 318/716
[58] Field of Search ................. 318/716–719, 318/138

[56] References Cited

U.S. PATENT DOCUMENTS 3,749,991 7/1973 Kuniyoshi ............... 318/717 X
3,896,351 7/1975 Blaschke ................. 318/717
4,125,796 11/1978 Nagase et al. ............ 318/716

Primary Examiner—Gene Z. Rubinson
Attorney, Agent, or Firm—Oblon, Fisher, Spivak, McClelland & Maier

[57] ABSTRACT

A synchronous machine drive apparatus is provided with a first exciting winding or windings having a first axis and second exciting windings having a second axis. A DC current responsive to the current of the armature windings is applied to the second DC exciting winding. A fundamental exciting current component $I_{FO}$ and an additional exciting component $\Delta I_F$ responsive to the current of the armature windings are applied to the first DC exciting winding or windings, whereby with respect to the current distribution around the gap of the synchronous machine, the armature reaction is correctly compensated.

7 Claims, 11 Drawing Figures

F I G. 3(a)
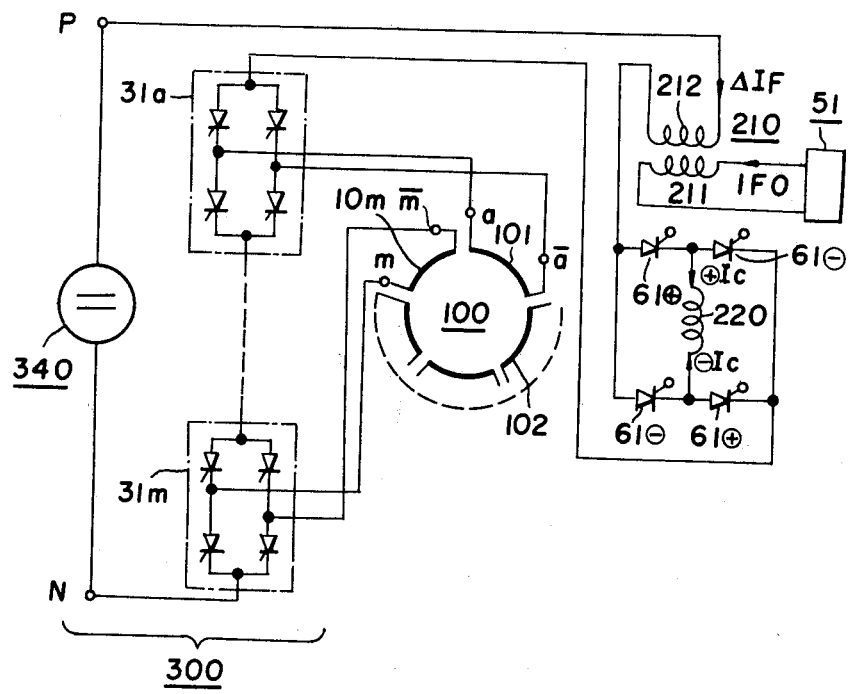

$\tau$: VALUE CORRESPONDING TO THE TORQUE
$AT_F$: ELECTROMOTIVE FORCE (AMPERE-TURN) WITH FIRST AXIS
$AT_{FO}$: FUNDAMENTAL (BASE) COMPONENT OF $AT_F$
$\Delta AT_F$: REINFORCING COMPONENT OF $AT_F$
$AT_C$: ELECTROMOTIVE FORCE (AMPERE-TURN) WITH SECOND AXIS

SYNCHRONOUS MACHINE DRIVE APPARATUS

CROSS REFERENCE TO RELATED APPLICATIONS

This application is a continuation-in-part of application Ser. No. 863,907, filed on Dec. 23, 1977.

BACKGROUND OF THE INVENTION

The present invention relates to a synchronous machine drive apparatus fed by a static power converter consisting of solid state switches.

A commutatorless motor is well known as one of this kind of apparatus. A typical prior art example of this kind of apparatus is shown in FIG. 1 which comprises a combination of a three-phase synchronous machine and a converter with a three-phase AC output. The three-phase synchronous machine is provided with a stator having AC windings (armature windings) 101 to 103 and a DC excited rotor 200. The three-phase AC output converter 300' may be an inverter or a cycloconverter, and the inverter is depicted in the figure. As is known, the synchronous machine drive apparatus uses a direct axis field winding (first exciting winding having a first axis) 210 and a compensating winding (second exciting winding having a second axis) 220 both being disposed around the DC excited rotor 200, in order to neutralize the armature reaction of the synchronous machine (see, for example, U.S. Pat. No. 3,749,991, herewith incorporated by reference).

Let us consider now the operation of the conventional apparatus. When a positive half wave $i_{wp}$ of a W-phase is commutated to a positive half wave $i_{up}$ of a U-phase, i.e. in a solid state switch $3_{wp}$ conduction is completed and current is shifted to a solid state switch $3_{up}$, conductors in which armature current changes due to the commutation are distributed over conductors belonging to the U- and W-phases (in FIG. 1, space distributions of the conductors are shown by black coated belts). The conductors are distributed in slots within a space corresponding to an electrical angle $\theta_u$ ranging from $\frac{2}{3}\pi$ (in the case of a Y-connection) to $\pi$ (in the case of a Δ-connection). When the commutation is finished, the distribution range of armature currents of one polarity becomes the distribution range of the conductors belonging to the U- and V-phases, this distribution range expressed by a space corresponding to an electrical angle $\theta_{load}$ ranging from $(\frac{2}{3})\pi$ to $\pi$. As shown in FIG. 1, the synchronous machine is connected with a Y-connection so that $\theta_u = \theta_{load} = (\frac{2}{3})\pi$. In the case of a Δ-connection, both are $\pi$.

As shown in FIG. 1, the compensating winding 220 does not coincidently correspond to the distribution range of the above-mentioned armature current. The reason for this is that the distribution range of the compensating winding 220 is narrow or the relative positions of these windings confronting each other across the gap are displaced with respect to each other due to the power factor angle $\phi$. For this reason, it is difficult to correctly compensate the armature reaction due to the distribution of the armature currents.

The distribution range $\theta_u$ of the commutating windings coincidently corresponds to that of the quadrature axis magnetic flux with respect to the surfaces facing through the gap. Particularly, in the case of the convex pole, only a part of the magnetic flux of the direct axis convex surface is subject to interlinkage.

Therefore, it has been difficult to secure stability of motor running insuring a constant power factor, stability of commutation, or stability of phase of the armature current fed thereto. Accordingly, it has been impossible to efficiently use the synchronous motor and the static power converter in operating condition in which the static power converter and synchronous machine can achieve safe, stable and high performance.

SUMMARY OF THE INVENTION

Accordingly, an object of the present invention is to improve the power factor or the stability of commutation, i.e. to improve the compensating characteristics with respect to the armature reaction, of a system comprising a synchronous machine drive apparatus fed from a static power converter.

In brief, a synchronous machine drive apparatus is provided with a first exciting winding or windings having a first axis and second exciting windings having a second axis. A DC current responsive to the current of armature windings is applied to the second DC exciting winding. A fundamental exciting current component $I_{FO}$ and an additional exciting component $\Delta I_F$ responsive to the current of the armature windings are applied to the first DC exciting winding or windings, whereby with respect to the current distribution around the gap of the synchronous machine, the armature reaction is correctly compensated.

BRIEF DESCRIPTION OF THE DRAWINGS

The present invention will be better understood from the following description taken in combination with the accompanying drawings, in which.

DESCRIPTION OF THE PREFERRED EMBODIMENTS

Figure 1:
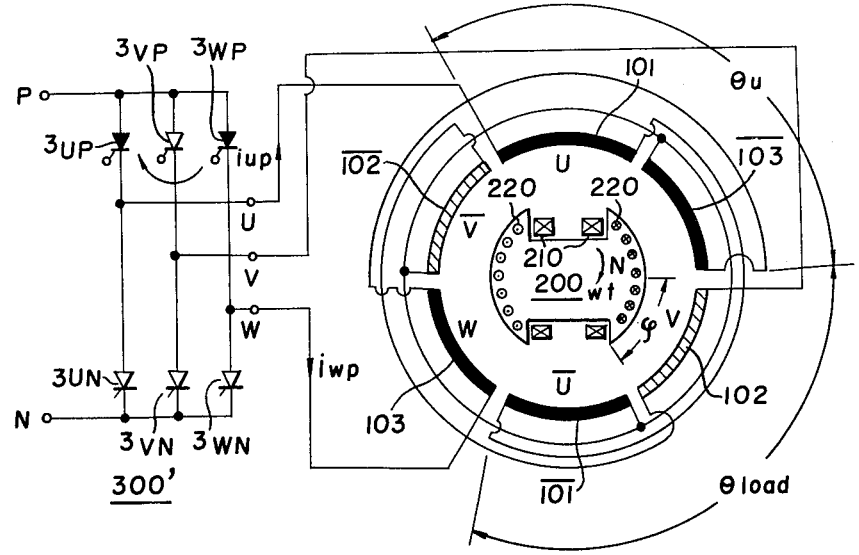
FIG. 1 shows a circuit diagram of a prior art synchronous machine drive apparatus.
Figure 2:
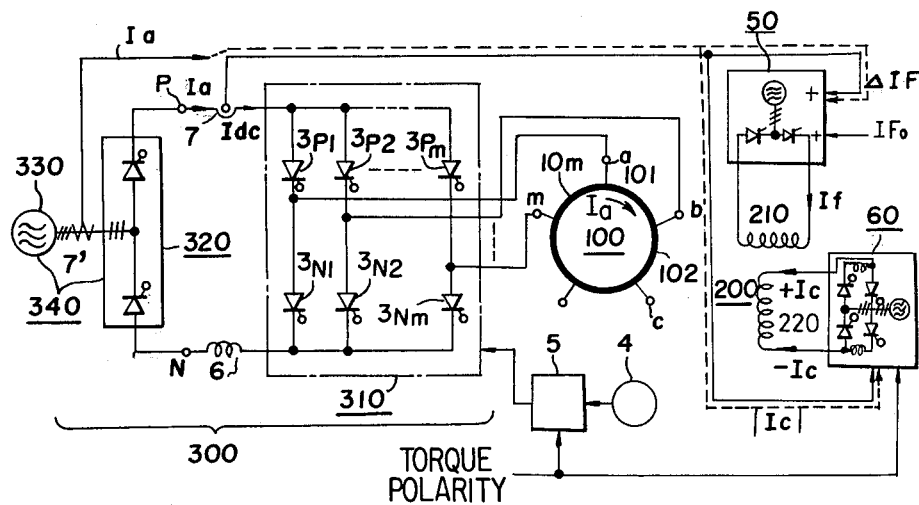
FIGS. 2 and 3 show circuit diagrams of synchronous machine drive apparatuses which are embodiments of the present invention.

Referring now to FIGS. 2 and 3, there are shown circuit diagrams of embodiments of the present invention. In FIG. 2, an armature winding 100 is a m-phase armature winding of which each of the phases forms a loop connection and of which the phase number m may be 3, 5, 6, 7 . . . Particularly, a value equal to or more than 5 is preferable for m. A static power converter 300 includes, for example: a DC power source 340 having a converter 320 for full-wave rectifying and having a three-phase AC power source 330; and an inverter 310 for converting the DC input thereof into an AC output. The inverter 310 is an m-phase bridge inverter comprising a plurality of series connections consisting of pairs of positive solid state switches $3_{Pl}$ to $3 pm$ and negative solid state switches $3_{Nl}$ to $3_{Nm}$ such as thyristors, transistors, etc. The DC power source 340 may be comprised of a DC power source and a DC chopper control apparatus (not shown). When the synchronous machine is operated preferentially in the mode in which the synchronous machine has a constant power factor, the static power converter 300 is controlled by a self-control system (that is, a closed loop system for determining the firing angles of the solid state switches depending upon the electrical angle of the synchronous machine itself) and thus uses a distributor 4 (one example of which is shown in U.S. Pat. No. 3,749,991 as member 14 in FIG. 1, herewith incorporated by reference) and a firing control means 5 to decide the phase of power supplied to the armature. A distributor, as used in the specification, can be a position sensor, an air gap flux detector, a detector of the internal EMF of the armature windings or the terminal voltage, or an optical or magnetic pulse generator responding to the rotation of the motor, for detecting the relative position between the armature and the field (flux) in electromagnetic relationship therebetween to control the conducting phases (i.e. the firing angles) of the switching elements (e.g. thyristor, transistor). Further examples of distributors which may be used for the purposes of this invention are shown as elements 14-15 in FIG. 1 or elements 34 and 35 of FIG. 3 of U.S. Pat. No. 3,383,574, elements 20, 21 ($P_1$-$P_6$) of FIG. 3 of U.S. Pat. No. 3,377,534, elements 68-84 of FIG. 1 of U.S. Pat. No. 3,720,863, and element 52 of FIG. 2 of U.S. Pat. No. 3,286,147, all herewith incorporated by reference. The self-controlled system is suitable with the machine running at a power factor of 1 or for the natural commutation (otherwise known as external excited commutation wherein extinction or turning-off of the solid state switches of the static power converter and commutation of the armature current are executed by the internal electromotive force of the synchronous machine).

Reference numeral 200 is a DC excited rotor with first and second DC exciting windings 210 and 220. The first DC excited winding 210 has a first magnetic axis (for example, direct axis) and is supplied with DC current from a first exciting means 50. The feeding current tracks a reference quantity which is the sum of a proportional component corresponding to the torque such as $\Delta I_F$ which may be detected by an armature current detecting means 7 (DC current transducer) or 7' (AC current transducer) and a given bias component $I_{FO}$. The given bias component $I_{FO}$ or fundamental component corresponds to a so called separate exciting component, i.e. a component to provide a no-load air gap flux (fundamental flux) corresponding to a no-load armature electromotive force. The field-weakening control and the like are performed by adjusting the component $I_{FO}$.

The second DC exciting winding 220 with second magnetic axis (for example, quadrature axis) is supplied a DC current $I_c$ from a second exciting means 60 having a reversible polarity ($\pm I_c$) responding to a required polarity of the torque. The absolute value $|I_c|$ of the DC exciting current is adjusted in response to a corresponding value corresponding to the torque (for example, the armature current). The first exciting means 50 may be a controlled rectifier, and the second exciting means may be a reversible polarity type of controllable rectifier for feeding the DC exciting current with reversible polarity.

Figure 7:
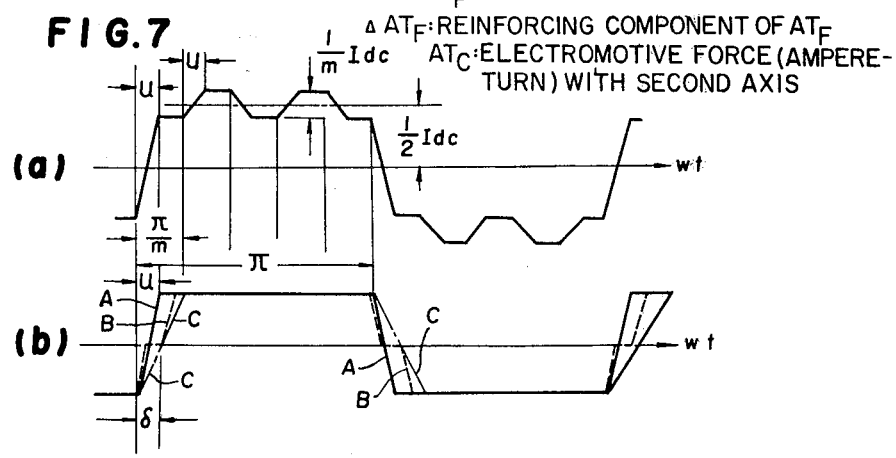

In FIG. 2, the current $I_a$ of one phase of the armature windings takes an almost rectangular waveform having parts of the positive and negative half-waves which each share a time interval corresponding to an electrical angle of $\pi$, and having no discontinuity (no-current interval), as shown in FIG. 7(a). The mean value is $\frac{1}{2}$ of the DC input current $I_{dc}$, and the overlapping time u of the current $I_a$ occurs due to self-commutation. The current includes a pulsating current component of magnitude $(1/m)I_{dc}$. The pulsating component is reduced with increase of phase number m. Such a rectangular wave is formed by quickly inverting the polarity of the winding current of the phase coupled between adjacent terminals between which commutation is performed. For example, the first phase winding 101 inverts the direction of its current flow from positive polarity to negative polarity when commutation is performed from the solid state switch $3_{p1}$ to the solid state switch $3_{p2}$. Similarly, the polarity of the current changes from negative polarity to positive polarity when the DC input current $I_{dc}$ commutates from the solid state switch $3_{N1}$ to the solid state switch $3_{N2}$. The polarity of the first phase current does not invert at the other commutations performed between other solid state switches.

Figures 3B, 3C:
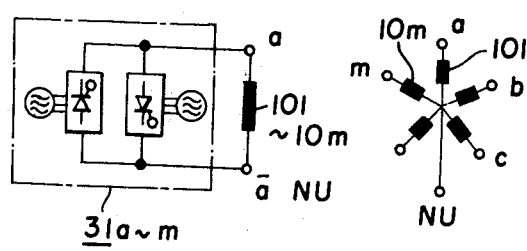

Turning now to FIG. 3, there is shown another embodiment of the present invention, in which a plurality of single phase power feeding units 31a to 31m are provided respectively for supplying single phase AC currents to each of the phases 101 to 101m. In this example, the phase number may be any one of 3, 4, 5, 6, 7 . . . but 4 or more is preferable. The single phase power feeding units 31a to 31m may be constructed by a single phase bridge inverter including solid state switches connected in a bridge network consisting of four branches as shown in FIG. 3(a) or by a reversible polarity rectifier (cycloconverter for single phase output) as shown in FIG. 3(b). The respective phases of AC windings 101 to 101m are connected with a neutral (common) line NU as shown in FIG. 3(c). In this connection, there is no restriction that the sum of the respective phase currents be zero, and current values of the respective phases may be independently established without any restriction from other phase current values. Accordingly, this connection is equivalent to the case when the respective phases are connected separately and independently to respective power converters. Therefore, in the inverter or the cycloconverter, various other static power converters may be employed in this connection with the neutral line NU. In FIG. 3(c), for example, the neutral line NU is connected to the neutral point of a power source (AC or DC power source).

The just-mentioned scheme using single phase power supply units 31a to 31m for the respective phases, respectively, may be embodied by the circuit in which the respective phases are insulated from one another, or by the circuit with the neutral line commonly connected. The single phase power feeding units 31a to 31m are each constructed by a bridge inverter unit, as shown in FIG. 3(a). In this construction, if the respective units 31a to 31m are connected in series with respect to the DC circuit, it is suitable for high voltage.

In the embodiment shown in FIG. 3, the first DC exciting winding 210 is divided into a winding 211 for feeding the fundamental component (field current) $I_{FO}$ for providing a no-load air gap flux and a winding 212 for providing the additional component $\Delta I_F$ in response to the armature current. An additional exciting winding 212 and the second DC exciting winding 220 are inserted in series in the inverter DC input path which is the armature current path. When this embodiment is made to operate with a torque of reversible polarity, a semiconductor switches 61 are used as means to reverse the excitation to change the conduction polarity of the second DC exciting winding 220.

In the embodiment of FIG. 3, waveforms of the winding currents (or voltages) at the respective phases may take various shapes like the waveforms A, B, and C shown in FIG. 7(b). The waveform A is obtained when the solid state switches on the opposite branches of the single phase bridge inverter 31a to 31m shown in FIG. 3(a) conduct at the same time (firing in phase), and its commutation overlapping angle is designated by u. The waveform B is formed when the firing time points (conduction initial phases) of the solid state switches on the opposite branches of the single phase bridge inverter unit 31a to 31m are shifted by δ the difference of electrical angle. The waveform C is formed when the polarity inversion interval is approximately π/m of the electrical angle in the cases which use either the cycloconverter, the single phase bridge inverter shown in FIG. 3(b), or the inverter or the cycloconverter with the neutral point NU shown in FIG. 3(c).

Figure 4A:
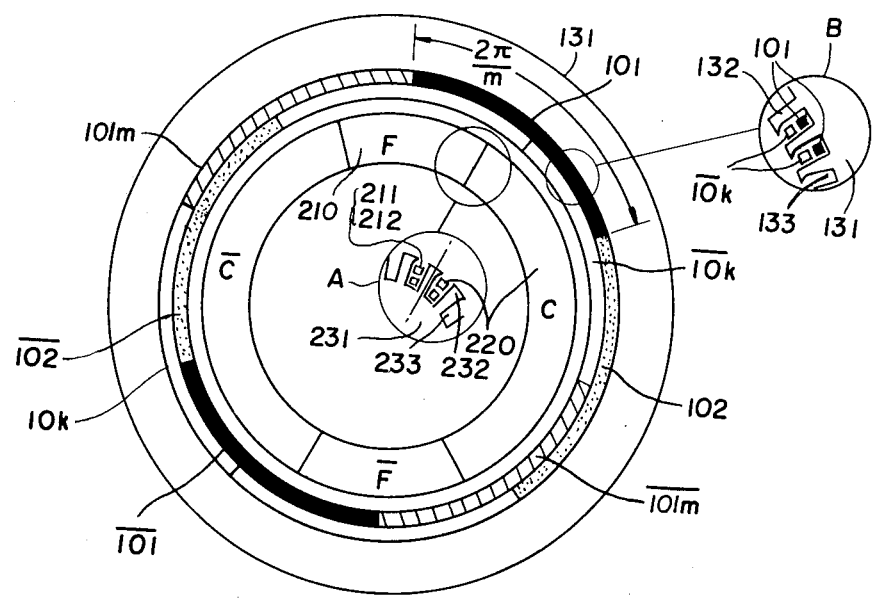
FIGS. 4(a) and (b) illustrate distributions of the winding conductors of the synchronous machine used in the present invention.

The present invention has been described with reference to various embodiments thereof. The description to follow explains the compensating behavior in the air gap of the synchronous machine in the apparatus of the present invention. FIG. 4(a) schematically shows the distributing regions of the respective winding conductors in the slots. In the figure, the first DC exciting winding 210 (in the FIG. 3 embodiment, it consists of windings 211 and 212) disposed around the rotor is distributed over the regions F and F̄. Some details of it are illustrated with an enlarged view in the circle A. As shown, the conductor of the winding 210, 211 and 212 is buried in the slots 233 formed between adjacent teeth 232 of the rotor core 231. Similarly, the second winding 220 is distributed over regions C and C̄ and buried in the slots 233 of the rotor core 231. The regions designated by F̄ and C̄ designate the distribution regions of the return conductors of the coils or of the conductors conducting the current with reverse polarity.

Distribution regions of the respective phases of the armature windings disposed around the inside of the stator are located over electrical angular regions of the respective phases. The angular width of each electrical angular region is designated by 2π/m. Some details of the distribution are shown enlarged in a circle B. As shown, the conductors of the armature windings 101 to 101m are buried in the slots 133 disposed between adjacent teeth 132 of the stator core 131. In FIG. 4, 101 to 101m designate distribution regions of the outward conductors and $\overline{101}$ and $\overline{101m}$ distribution regions of the return conductors.

Figure 4B:
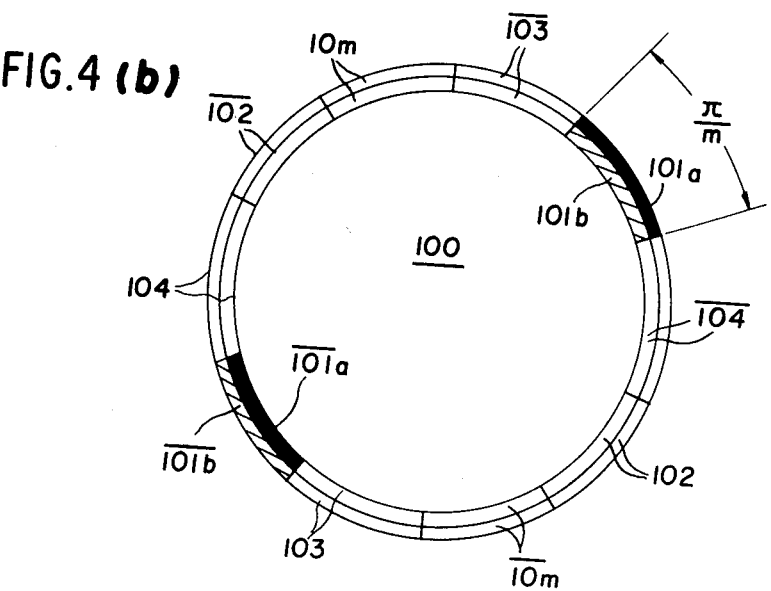

Another embodiment of the distribution regions of the armature winding in respective phases is shown in FIG. 4(b). The figure shows an example in which the conductor of each phase is distributed within each phase electrical angular region of π/m to narrow the distribution width of each phase. In this case, each phase conductor is further divided into two coil sections. For example, the first phase winding 101 is divided into a first coil group 101a and $\overline{101a}$ and a second coil group 101b and $\overline{101b}$ both being connected in series. It permits a winding method (short pitch winding method) in which the inner conductor group 101b and $\overline{101a}$ is slightly shifted angularly with respect to the outer conductor group 101a and $\overline{101b}$. For example, when the inner conductor group 101b and $\overline{101a}$ is shifted counterclockwise by π/m, it is equivalent to the distribution of FIG. 4(a).

As described above, the range of the distribution belt of the conductors for each pole and each phase may be restricted within π/2 of the electrical angle. For example, if the phase belt is 2π/m (FIG. 4(a)), it suffices with 4 or more of phase number. If the phase number is 2 or 3, it suffices with π/m of the phase belt such as in FIG. 4(b).

The armature winding wound in the above-mentioned winding manner is applied to the embodiments shown in FIGS. 2 and 3 in which power feeding of the respective phases is with waveforms as shown in FIGS. 2 and 3. In this case, current distributions when commutation is performed, i.e. one of the phase currents is inverting its polarity, are illustrated in FIGS. 5(a) or (b). FIG. 5(a) shows a positive torque condition in which the machine is motively running in positive rotation or is regeneratively braking in negative rotation (generator running). FIG. 5(b) shows a negative torque condition in which the machine is regeneratively braking in positive rotation (generator running) or it is motively running in negative rotation. In the figure, an arrow ωt designates the rotational direction in the motively running mode, and ω't the same in the generatively running mode. φ designates the angular difference (power factor angle of the armature) between the magnetomotive force (m.m.f.) produced by the first DC exciting winding 210 and the m.m.f. produced by the armature windings as defined in the motively running mode. φ' is the angular difference (which is defined in the motively running mode) in the generatively running mode. When the angular difference φ' is redefined with reference to the generatively running, the angular difference φ and φ' are equal, i.e. $\phi' = \pi - \phi$.

Figure 5:
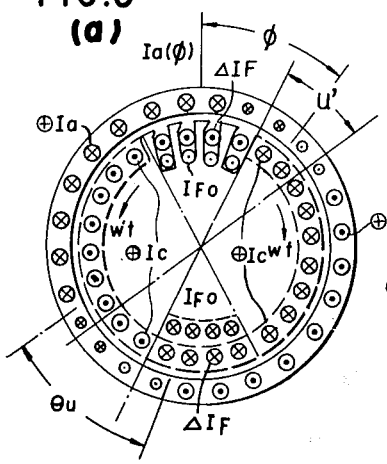
FIGS. 5 to 7 are diagrams to illustrate the operation of the present invention.
Figure 5:
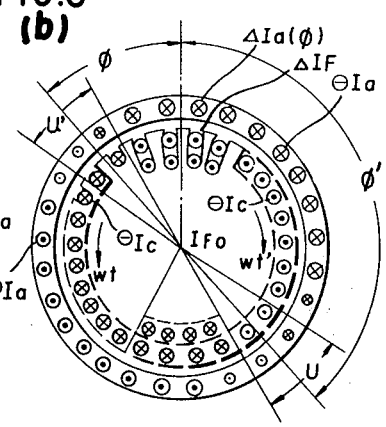

In FIG. 5, reference character u' designates the commutating region. In this region, the center of the distribution of the conductors which are commutating relatively shifts (rotates) with respect to the rotor during the commutation period (i.e. overlapping angle u) of one phase. And this region u' corresponds to the overlapping angle u. The distribution of the armature current is denoted by symbols ⊗ and ⊙ of $I_a$ and the commutating conductor's sections are denoted by small but the same symbols ⊗ and ⊙. The current distribution belt of the second DC exciting winding 220 is denoted by the same symbols 11⊗ and ⊙ of $I_c$. For both the currents $I_a$ and $I_c$, in the case of positive torque, these are represented by ⊕$I_a$ and ⊕$I_c$, and in the case of negative torque, these by ⊖$I_a$ and ⊖$I_c$. $\Delta I_F$ is used to designate an additional component of the first DC exciting winding 210. This component is proportional to the armature current. $I_{Fo}$ is used to designate the fundamental exciting current component for providing the no-load air gap flux. The magnetic axis of the total armature current is displaced by the angular difference φ (corresponding to the current phase angle φ in the time domain) from the magnetic axis of the second exciting current $I_c$ of the second DC exciting winding 220 as shown in FIG. 5. The local armature current $I_a(\phi)$ is disposed facing the first exciting winding conductor 210 via an air gap. But, in this embodiment, the local armature current $I_a(\phi)$ is offset, that is compensated, by the current component $\Delta I_F$. Accordingly, the $\Delta I_F$ component is selected to be the current A/cm or A/m per unit radial distance in the peripheral direction which is much the same as the armature current like the current $I_c$ of the second DC exciting winding 220. When the additional current component $\Delta I_F$ and the fundamental exciting current component $I_{Fo}$ for providing the no-load magnetic flux are composed (or summed), the current distribution density in the peripheral direction of the conductors of the first DC exciting winding 210 or (211+212) (A/m, amperes per a unit distance in the peripheral radial direction; or A/rad, ampere per unit electrical angle) adaptively may be larger than that of the conductor of the second DC exciting winding 220. For this reason, more advisably the depth of the slot must be deepened or the current density (A/mm$^2$) must be increased compared to that of the second exciting winding.

Cylindrical construction is preferable for the rotor, in consideration of the compensating of the local component $I_a(\phi)$ by the additional current component $\Delta I_F$ proportional to the torque corresponding to the armature current by the first DC exciting winding 210, and of the providing of desired compensation flux (or commutation flux) to the armature winding which is commutating (as the conductor indicated by small $\otimes$ and $\odot$ in the angular band $\theta_u$). Here, the electromotive force generated by the compensating flux cancels the leakage flux voltage drop expressed by ldi/dt; here, l is the leakage inductance of the armature winding at the commutating interval. In the convex pole, none of the pole piece teeth are distributed in the commutation band $\theta_u$. Therefore, it is problematic for the performing of the leakage compensation or for providing the commutation flux.

Figure 6:
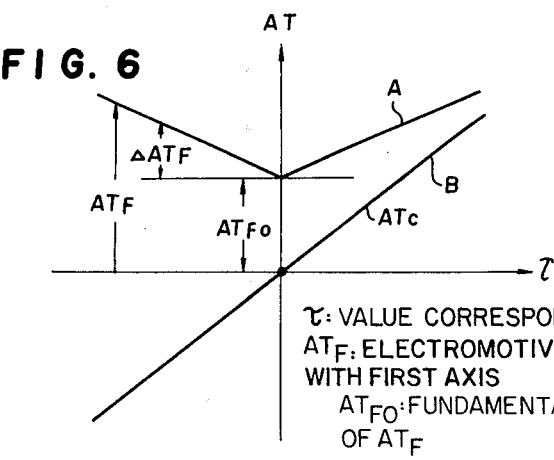

As seen from the foregoing description, magnetomotive force $AT_F$ (the sum of additional component $\Delta AT_F$ proportional to the armature current and no-load exciting component $AT_{FO}$) produced by the first DC exciting winding 210, or 211 and 212, changes with respect to torque $\tau$, as plotted by a straight line A in FIG. 6. Thus, there is no need for exchange of polarity. The magnetomotive force $AT_c$ produced by the second DC exciting winding 220 versus torque $\tau$ is shown by a straight line B. When magnetic saturation is taken into account, the inclination of the straight line is slightly changed so as to increase as the torque increases.

As described above, in the present invention, components responsive to a value responding to the torque (for example the armature current) are supplied to both the first and second DC exciting windings, respectively, with the result that the compensation for the armature reaction is remarkably improved. Especially, the additional component $\Delta I_F$ compensates the local component produced by the local armature conductor opposed to the conductor of the first exciting winding.

The local compensating effect is further improved by narrowing the conductor distribution range for one phase winding of the armature below $\pi/2$ for each pole. It is further improved to provide the commutating flux by disposing the DC exciting winding on the outer periphery (rotating - field type) or the inner periphery (rotating - armature type) of a substantially cylindrical core. If AC power (current or voltage) with substantially rectangular waveform (FIG. 7) and with polarity cyclically inverting each electrical angle $\pi$ is supplied to the armature windings of respective phases, matching is attained, i.e. instantaneous armature current distribution is improved compared to a compensating current distribution. The substantially rectangular wave is obtained by driving with the m-phase bridge inverter, with a ring connection for the m-phase armature windings. The same waveform is obtained when the m-phase armature windings are connected in star connection with a neutral point or each phase separately connected, and a single phase power feeding unit feeds power to each phase. Furthermore, DC exciting current distribution density suitable for the above-mentioned effect may be obtained when the current distribution density A/rad each unit electrical angle (or current A/cm each unit distance in the peripheral direction) of the first DC exciting winding with first magnetic axis is larger than that of the second DC exciting winding with second magnetic axis.

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by Letters Patent in the United States is:

1. A synchronous machine drive system comprising:
   (A) A synchronous machine having
      a plurality of poly-phase armature windings;
      a first exciting winding with a first magnetic axis for producing a fundamental flux of an air gap of said synchronous machine to provide the fundamental flux to said armature windings; and
      a second exciting winding with a second magnetic axis;
   (B) A static power converter with A.C. power consisting of a plurality of solid-state switches for converting to or from A.C. power between said armature winding and a source;
   (C) first exciting means for supplying a first D.C. current to said first exciting winding;
   (D) second exciting means for adjustably supplying a second D.C. current to said second exciting winding in reversible polarity of said second D.C. current and in response to a value corresponding to the torque of said synchronous machine; and
   (E) additional exciting means for adding to the magnetomotive force generated by said first exciting winding.

2. A synchronous machine drive system according to claim 1, wherein:
   the conductor distribution range per $\pi$ of electric angle of the conductor of one phase winding of said poly-phase armature windings is below $\pi/2$ in relation to the distribution of conductors of the armature windings in an air gap space of the synchronous machine.

3. A synchronous machine drive system according to claim 2 wherein:
   said armature windings are provided on a stator;
   said first and second exciting windings are provided on a substantially cylindrical rotor; and
   said first and second exciting windings are distributed around the entire periphery of said rotor;
   said first and second exciting windings being distributed around the entire periphery of said rotor in relationship such that the magnetic axes of the first and second windings are perpendicular to each other.

4. A synchronous machine drive system according to claim 3 wherein said static power converter comprises:
   means for feeding A.C. currents or voltages which have substantially rectangular waveforms and have polarity cyclically inverted each half cycle to each phase of said armature windings.

5. A synchronous machine drive system according to claim 3 wherein:
   said armature windings are connected in ring-connection and are connected to AC output terminals of an m-phase bridge inverter comprising a number m of pairs of which each is connected in series combination of positive solid state switches and negative solid state switches, and m equals the phase number of said armature windings.

6. A synchronous machine drive system according to claim 3, wherein said static power converter consists of: single phase power converter units of which each unit converts single phase a.c. power, and each phase of said armature windings are individually connected to each of said single phase power converter units in relationship of different phase with respect to each other.

7. A synchronous machine drive system according to claim 3 in which the current distribution density for each unit electrical angle of said first exciting winding is larger than that of sid second exciting winding.

* * * * *